(12) United States Patent
Sun

(10) Patent No.: US 11,020,654 B2
(45) Date of Patent: Jun. 1, 2021

(54) SYSTEMS AND METHODS FOR INTERACTION WITH AN APPLICATION

(71) Applicant: SUZHOU YAOXINYAN TECHNOLOGY DEVELOPMENT CO., LTD., Taicang (CN)

(72) Inventor: Shufen Sun, Changchun (CN)

(73) Assignee: SUZHOU YAOXINYAN TECHNOLOGY DEVELOPMENT CO., LTD., Taicang (CN)

( * ) Notice: Subject to any disclaimer, the term of this patent is extended or adjusted under 35 U.S.C. 154(b) by 0 days.

(21) Appl. No.: 16/345,241

(22) PCT Filed: Dec. 25, 2017

(86) PCT No.: PCT/CN2017/118192
§ 371 (c)(1),
(2) Date: Apr. 25, 2019

(87) PCT Pub. No.: WO2018/121463
PCT Pub. Date: Jul. 5, 2018

(65) Prior Publication Data
US 2019/0275419 A1 Sep. 12, 2019

(30) Foreign Application Priority Data
Dec. 30, 2016 (CN) .......................... 201621483468.1

(51) Int. Cl.
*A63F 13/23* (2014.01)
*G06T 7/246* (2017.01)
(Continued)

(52) U.S. Cl.
CPC ............ *A63F 13/213* (2014.09); *A63F 13/23* (2014.09); *G02B 27/01* (2013.01);
(Continued)

(58) Field of Classification Search
CPC ...... A63F 13/212; A63F 13/213; A63F 13/23; G02B 27/0093; G06F 3/011; G06T 7/33
See application file for complete search history.

(56) References Cited

U.S. PATENT DOCUMENTS

2009/0324017 A1 12/2009 Gordon et al.
2013/0120114 A1 5/2013 Gu et al.
(Continued)

FOREIGN PATENT DOCUMENTS

| CN | 103366618 A | 10/2013 |
|---|---|---|
| CN | 104460950 A | 3/2015 |

(Continued)

OTHER PUBLICATIONS

International Search Report in PCT/CN2017/118192 dated Mar. 22, 2018, 4 Pages.

(Continued)

*Primary Examiner* — David L Lewis
*Assistant Examiner* — Robert E Mosser
(74) *Attorney, Agent, or Firm* — Metis IP LLC

(57) ABSTRACT

A system and method for interaction with a user are provided. The system may include a head-mounted display device, at least one sensor implemented on the head-mounted display device, at least one storage medium including a set of instructions, and at least one processor configured to communicate with the at least one storage medium. When executing the set of instructions, the system may be configured to: acquire, by the at least one sensor, a first facial image of a user; and determine, by the at least one processor, an expression of the user at least based on the first facial image of the user.

12 Claims, 15 Drawing Sheets

(51) Int. Cl.
    *G06F 3/01*         (2006.01)
    *G06N 3/02*        (2006.01)
    *A63F 13/213*     (2014.01)
    *G02B 27/01*       (2006.01)
    *G06F 3/0482*     (2013.01)
    *G06K 9/00*        (2006.01)
    *H04L 29/06*      (2006.01)

(52) U.S. Cl.
    CPC ......... *G02B 27/0172* (2013.01); *G06F 3/012* (2013.01); *G06F 3/0482* (2013.01); *G06K 9/00261* (2013.01); *G06K 9/00268* (2013.01); *G06K 9/00302* (2013.01); *G06N 3/02* (2013.01); *G06T 7/248* (2017.01); *H04L 67/38* (2013.01); *A63F 2300/1025* (2013.01); *A63F 2300/1087* (2013.01); *G02B 2027/014* (2013.01); *G02B 2027/0138* (2013.01); *G02B 2027/0187* (2013.01); *G06F 2203/011* (2013.01); *G06T 2207/20084* (2013.01); *G06T 2207/30201* (2013.01)

(56) References Cited

U.S. PATENT DOCUMENTS

| | | | |
|---|---|---|---|
| 2014/0057720 A1* | 2/2014 | Chowdhary | A63F 13/212 463/36 |
| 2015/0310263 A1 | 10/2015 | Zhang et al. | |
| 2015/0335295 A1 | 11/2015 | Park et al. | |
| 2016/0216760 A1 | 7/2016 | Trutna et al. | |
| 2016/0349839 A1 | 12/2016 | Ohba | |
| 2017/0287194 A1* | 10/2017 | Katz | G06F 3/012 |

FOREIGN PATENT DOCUMENTS

| | | |
|---|---|---|
| CN | 104615252 A | 5/2015 |
| CN | 104809380 A | 7/2015 |
| CN | 205103761 U | 3/2016 |
| CN | 105654537 A | 6/2016 |
| CN | 205880812 U | 1/2017 |
| CN | 106599558 A | 4/2017 |
| CN | 106648071 A | 5/2017 |
| CN | 206387961 U | 7/2018 |

OTHER PUBLICATIONS

Written Opinion in PCT/CN2017/118192 dated Mar. 22, 2018, 7 Pages.

* cited by examiner

800

802

Obtaining biological information of a user

804

Determining an identification of the user based on the obtained biological information of the user

806

Authenticating the identification of the user as a registered identification

FIG. 8

SYSTEMS AND METHODS FOR INTERACTION WITH AN APPLICATION

CROSS-REFERENCE TO RELATED APPLICATIONS

This application is a U.S. national stage under 35 U.S.C. § 371 of International Application No. PCT/CN2017/118192, filed on Dec. 25, 2017, designating the United States of America, which claims priority of Chinese Patent Application No. 201621483468.1, filed on Dec. 30, 2016, the contents of which are hereby incorporated by reference.

TECHNICAL FIELD

The present disclosure generally relates to processing of data, and more particularly, relates to systems and methods for interaction with a user.

BACKGROUND

Online applications including game applications, social applications, are important in people's daily life. However, interaction between users and the online applications are substantially limited in that to interact with online applications, a controller such as a mouse, a keyboard, or a hand shank, may be necessary. Besides, with the development of artificial intelligence of the interaction, a demand for security of private information grows. Traditional methods of authenticating a user identification, such as authenticating an input username and password, may not satisfy the security demand. Thus, it may be desirable to provide a method and system for convenient interaction between users and applications, as well as a secure authentication of user identification.

SUMMARY

According to an aspect of the present disclosure, a system for interaction with a user may include a head-mounted display device, at least one sensor implemented on the head-mounted display device, at least one storage medium including a set of instructions, and at least one processor configured to communicate with the at least one storage medium. When executing the set of instructions, the system may be configured to; acquire, by the at least one sensor, a first facial image of a user; and determine, by the at least one processor, an expression of the user at least based on the first facial image of the user.

In some embodiments, the system may be further configured to determine whether a trigger condition may be satisfied; and acquire the first facial image of the user in response to a determination that the trigger condition may be satisfied.

In some embodiments, the system may be further configured to: obtain, from the storage medium, a reference image; and map the first facial image of the user with the reference image to determine the expression of the user.

In some embodiments, the system may be further configured to: obtain, from the storage medium, a reference image; and extract a first mapping image corresponding to a facial point of the user from the reference image; extract a second mapping image corresponding to the facial point of the user from the facial image; and map the first mapping image with the second mapping image to determine the expression of the user.

In some embodiments, the system may be further configured to: obtain a neural network; and determine the expression of the user based on the neural network and the first facial image of the user.

In some embodiments, the system may be further configured to; extract a first feature from the facial image of the user; and determine the expression of the user based on the neural network and the extracted first feature.

In some embodiments, the system may be further configured to: obtain a second facial image of the user, the second facial image of the user being behind the first facial image of the user in terms of time.

In some embodiments, the system may be further configured to: determine the expression of the user based on the neural network, the first facial image of the user, and the second facial image of the user.

In some embodiments, the system may be further configured to: extract a first feature from the first facial image, the first feature corresponding to a facial point of the user; extract a second feature from the second facial image, the second feature corresponding to the facial point of the user; determine a movement of the facial point of the user based on the extracted first feature and the second feature; and determine the expression of the user based on the neural network and the determined movement of the facial point of the user.

In some embodiments, the system may be further configured to: store the determined expression of the user as a digital file in the storage medium; and update the neural network model based on the determined expression of the user.

In some embodiments, the system may be further configured to: acquire, by the at least one sensor, biological information of the user; and process the biological information of the user and the facial image of the user to determine the expression of the user.

In some embodiments, the system may be further configured to: display the determined expression of the user.

In some embodiments, the system may be further configured to: provide the determined expression of the user to an external device connected to the head-mounted display device.

In some embodiments, the system may be further configured to: execute an operation based on the determined expression of the user.

In some embodiments, the system may be further configured to: adjust at least one running parameter of an application or operating system implemented on the head-mounted display device or an external device connected to the head-mounted display device.

In some embodiments, the system may be further configured to: determine an emotional state of the user based on the determined expression of the user; and provide a feedback based on the determined emotional state of the user.

In some embodiments, the system may be further configured to: provide a set of options related to the determined emotional state of the user for the user to choose; and receive information related to a choice among the set of options of the user.

In some embodiments, the system may be further configured to: adjust a running parameter of the application or the operating system.

In some embodiments, the application may be a game application.

In some embodiments, the parameter may be related to a rate of progress of the game application, or a difficulty level of the game application.

In some embodiments, the system may be further configured to: generate a first image based on the determined expression of the user, wherein the first image may include at least one of an image of nose of the user, an image of mouth of the user, an image of an ear of the user, an image of an eye of the user, or an image of an eyebrow of the user.

In some embodiments; the at least one sensor may be configured to acquire the first facial image of the user in real time.

In some embodiments, the head-mounted display device may include at least one of a virtual reality device, augmented reality device.

In some embodiments; the at least one sensor implemented on the head-mounted display device may include a camera.

In some embodiments, the first facial image further includes at least one of an image of a facial organ, an image of a facial point, an image of a facial line, or an image of a facial wrinkle.

According to another aspect of the present disclosure, a method for interaction with as user may be implemented on a head-mounted display device. The method may include: acquiring, by at least one sensor implemented on the head-mounted display device, a first facial image of a user; and determining an expression of the user at least based on the first facial image of the user.

In some embodiments; the acquiring a first facial image of the user may include: determining whether a trigger condition may be satisfied; and acquiring the first facial image of the user in response to a determination that the trigger condition may be satisfied.

In some embodiments, the trigger condition may be related to a facial movement of the user, and wherein the facial movement of the user may be determined at least based on the first facial image.

In some embodiments, the trigger condition may be determined by a trigger application.

In some embodiments, the determining an expression of the user at least based on the first facial image of the user may include: obtaining, from a storage, a reference image; and mapping the first facial image of the user with the reference image to determine the expression of the user.

In some embodiments, the determining an expression of the user at least based on the first facial image of the user may include: obtaining a reference image; extracting a first mapping image corresponding to a facial point of the user from the reference image; extracting a second mapping image corresponding to the facial point of the user from the facial image; and mapping the first mapping image with the second mapping image to determine the expression of the user.

In some embodiments, the method may further include: storing the determined expression of the user as a digital file in the storage; and updating the pattern recognition database based on the determined expression of the user.

In some embodiments, the determining an expression of the user at least based on the first facial image of the user may include: obtaining a neural network; and determining the expression of the user based on the neural network and the first facial image of the user.

In some embodiments; the determining the expression of the user based on the neural network and the first facial image of the user may include: extracting a first feature from the first facial image of the user; and determining the expression of the user based on the neural network and the extracted first feature.

In some embodiments, the feature relates to at least one of a facial organ of the user, a facial point of the user, a facial line of the user, or a facial wrinkle of the user.

In some embodiments, the method may further may include: obtaining a second facial image of the user, the second facial image of the user being behind the first facial image of the user in terms of time.

In some embodiments; the determining an expression of the user at least based on the first facial image of the user may include: determining the expression of the user based on the neural network, the first facial image of the user, and the second facial image of the user.

In some embodiments, the determining the expression of the user based on the neural network, the first facial image of the user, and the second facial image of the user may include: extracting a first feature from the first facial image, the first feature corresponding to a facial point of the user; extracting a second feature from the second facial image, the second feature corresponding to the facial point of the user; determining a movement of the facial point of the user based on the extracted first feature and the second feature; and determining the expression of the user based on the neural network and the determined movement of the facial point of the user.

In some embodiments, the method may further include: storing the determined expression of the user as a digital file in a storage; and updating the neural network model based on the determined expression of the user.

In some embodiments, the method may further include: acquiring, by the at least one sensor, biological information of the user; and processing the biological information of the user and the facial image of the user to determine the expression of the user.

In some embodiments, the method may further include: providing the determined expression of the user to an operating system or an application implemented on the head-mounted display device.

In some embodiments, the method may further include: providing the determined expression of the user to an operating system or an application implemented on an external device connected to the head-mounted display device.

In some embodiments, the method may further include: executing an operation based on the determined expression of the user.

In some embodiments, the method may further include: the executing an operation based on the determined expression of the user may include: adjusting at least one running parameter of an application or an operating system.

In some embodiments, the method may further include: determining an emotional state of the user based on the determined expression of the user; and providing a feedback based on the determined emotional state of the user.

In some embodiments, the providing a feedback based on the determined emotional state of the user may include: providing a set of options related to the determined emotional state of the user for the user to choose; and receiving information related to a choice among the set of options of the user.

In some embodiments, the providing a feedback based on the determined emotional state of the user may include: adjusting a running parameter of an application or operating system.

In some embodiments, the application may be a game application.

In some embodiments, the parameter may be related to a rate of progress of the game application, or a difficulty level of the game application.

In some embodiments, the method may further include: generating a first image based on the determined expression of the user, wherein the image may include at least one of an image of nose of the user, an image of mouth of the user, an image of an ear of the user, an image of an eye of the user, or an image of an eyebrow of the user, or a facile line of the user, or a facial wrinkle of the user.

In some embodiments, the method may further include: generating at least part of a virtual character related to the user based on the first image.

In some embodiments, the generated first image may be configured to update a second image including at least one of a virtual facial image of the user, a cartoon facial image of the user, or a realistic facial image of the user.

In some embodiments, the updated second image may be used to represent the user in an application or an operating system.

In some embodiments, the at least one sensor may include an image receiver.

In some embodiments, wherein the head-mounted display device further include: a mounting component implemented by the image receiver, a display component mounted on the mounting component, and an image processor configured to process the facial image of the user to determine the expression of the user.

In some embodiments, the image receiver may be detachably mounted on the mounting component.

In some embodiments, the image receiver may include a communication plug, and the image processor may include a communication socket.

In some embodiments, the communication plug may be configured to plug into the communication socket to transmit the facial image of the user to the image processor.

In some embodiments, the mounting component may include a shell and an immobilizing component, the immobilizing component being configured to immobilize the shell on the user's head.

In some embodiments, the shell defines a chamber, and an end of the shell may include an opening connected to the chamber.

In some embodiments, the shell may include a side panel and a front panel, and wherein the image receiver may be mounted on the side panel.

In some embodiments, the image receiver may include an internal image receiver and an external image receiver, wherein the internal image receiver may be located on an inner surface of the side panel, and the external image receiver may be located on an external surface of the side panel.

In some embodiments, the display component includes a display screen configured on the front panel, and a lens component, the lens component including a frame and a lens configured on the frame.

In some embodiments, the mounting component may include a bracket and a temple, and the display component may include a projector.

In some embodiments, the image receiver may be configured on the bracket.

In some embodiments, the projector may be configured on the mounting component to project the presentation result to an eye of the user.

In some embodiments, the image receiver may be configure to collect at least one of an image of the user's mouth, an image of the user's nose, an image of the user's facial muscles, an image of the user's eyes, an image of the user's eyebrows, an image of the user's eyelids, or an image of the user's glabella.

In some embodiments, the method may further include a data transmitter being located on the mounting component and being connected to the image processor, wherein the data transmitter may be configured to communicate with an external device.

According to another aspect of the present disclosure, a method for interaction with a user may be implemented on a head-mounted display device having or being connected to at least one processor and storage. The method may include: obtaining, by at least one sensor implemented on the head-mounted display device, biological information of a user; determining, based on the obtained biological information of the user; an adjustment strategy corresponding to at least one running parameter of an application or an operating system; and adjusting the at least one running parameter of the application or the operating system.

In some embodiments, the determining an adjustment strategy may include: determining, based on the obtained biological information of the user, an emotional state of the user; and determining the adjustment strategy based on the determined emotional state of the user.

In some embodiments; the adjustment strategy may include: adjusting a run-time length of the application.

In some embodiments, the application may be a game application, and the adjustment strategy may further include: adjusting a difficulty level of the game application.

In some embodiments; the adjusting a difficulty level of the game may include: adjusting an ability parameter indicative of attacking capability of non-player characters in the game application.

In some embodiments, the determining an emotional state of the user may include: determining at least one of an arousal level of the user, a concentration level of the user, an interest level of the user, an emotion level of the user, or a tension level of the user based on the obtained biological information.

In some embodiments, the method may further include: determining an identification of the user based on the obtained biological information of the user.

In some embodiments, the method may further include: authenticating the identification of the user as a registered identification.

In some embodiments, the method may further include: reading, from a storage, historical information associated with the identification of the user; and recommending an item to the user based on the historical information.

In some embodiments, the method may further include at least one of obtaining initial application settings, obtaining initial operating system settings, obtaining history application settings, obtaining history operating system settings, or storing the biological information of the user or the emotional state of the user as a digital file.

In some embodiments; the biological information of the user may include at least one of facial information of the user, pupil information of the user, and heart-beat information of the user.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 8 is a flowchart illustrating an exemplary process for authenticating an identification of a user as a registered identification according to some embodiments of the present disclosure;

DETAILED DESCRIPTION

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular exemplary embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including", when used in this specification; specify the presence of stated features, integers, steps, operations, elements, and/or components, but do not preclude the presence or addition of one or more other features; integers, steps; operations, elements, components; and/or groups thereof.

It will be understood that the term "system," "engine," "unit," and/or "module" used herein are one method to distinguish different components, elements, parts, section or assembly of different level in ascending order. However, the terms may be displaced by another expression if they achieve the same purpose.

Figure 1:
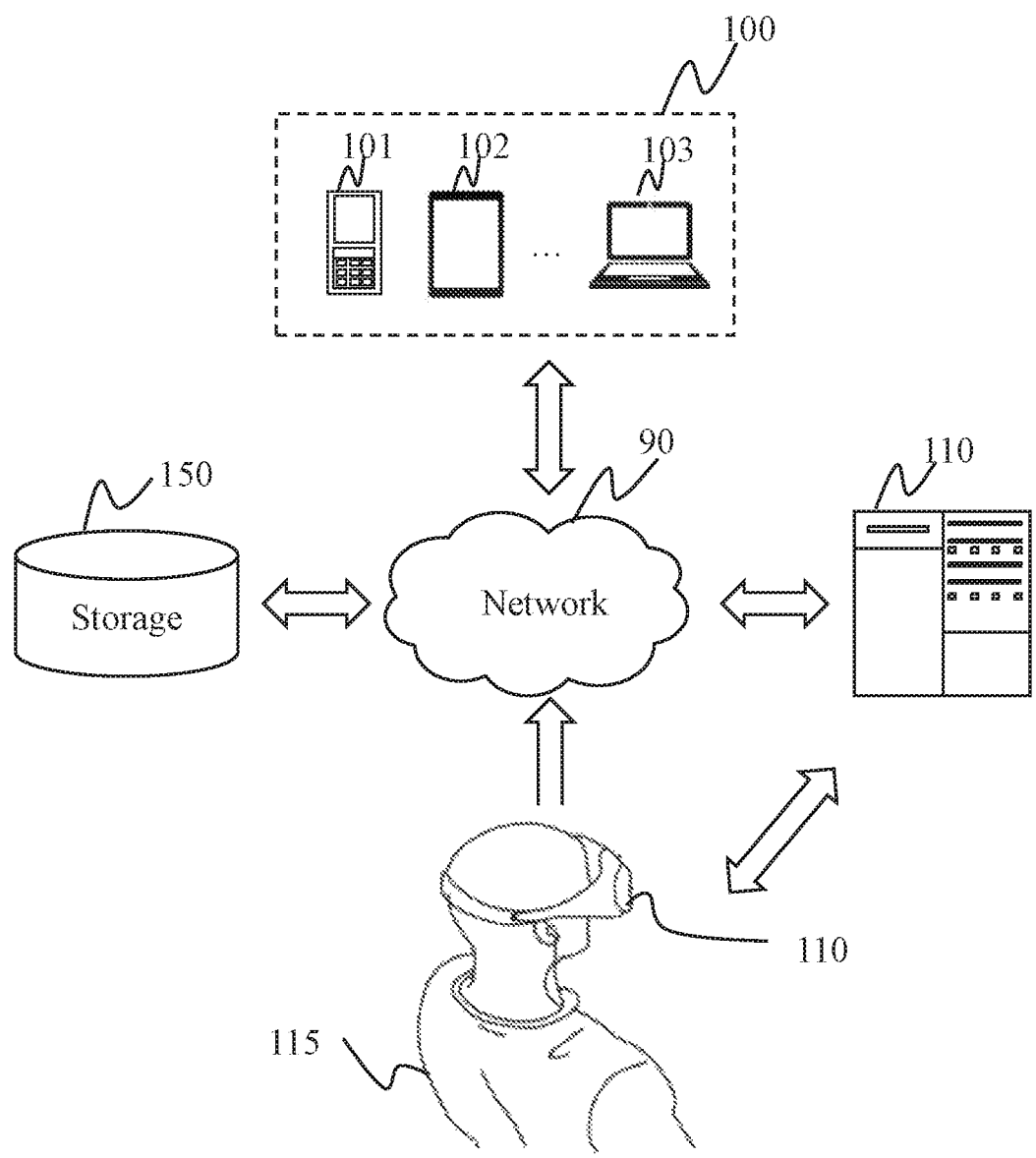
FIG. 1 is a schematic diagrams illustrating an exemplary interaction system according to some embodiments of the present disclosure.

Generally, the word "module" or "unit" as used herein, refers to logic embodied in hardware or firmware, or to a collection of software instructions. A module or a unit described herein may be implemented as software and/or hardware and may be stored in any type of non-transitory computer-readable medium or another storage device. In some embodiments, a software module/unit may be compiled and linked into an executable program. It will be appreciated that software modules can be callable from other modules/units or themselves, and/or may be invoked in response to detected events or interrupts. Software modules/units configured for execution on computing devices (e.g., processing engine 140 as illustrated in FIG. 1) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units may be included in connected logic components, such as gates and flip-flops, and/or can be included of programmable units, such as programmable gate arrays or processors. The modules/units or computing device functionality described herein may be implemented as software modules/units but may be represented in hardware or firmware. In general, the modules/units described herein refer to logical modules/units that may be combined with other modules/units or divided into sub-modules/sub-units despite their physical organization or storage. The description may apply to a system, an engine, or a portion thereof.

It will be understood that when a unit, engine or module is referred to as being "on," "connected to," or "coupled to," another unit, engine, or module, it may be directly on, connected or coupled to, or communicate with the other unit, engine, or module, or an intervening unit, engine, or module may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of the present disclosure. It is to be expressly understood, however, that the drawings are for the purpose of illustration and description only and are not intended to limit the scope of the present disclosure. It is understood that the drawings are not to scale.

Provided herein are systems and components for interaction with an application. The present disclosure intends to provide an intelligent application that better understands a user of the application by analyzing his/her facial image. By processing the facial image, an expression of the user may be determined, and the application may generate a feedback based on the expression of the user. Thus, a more convenient interaction between the user and the application may be achieved.

For illustration purposes, the disclosure describes systems and methods for interaction with an application implemented on an interaction system. It should be noted that the interaction system 100 described below is merely provided for illustration purposes, and not intended to limit the scope of the present disclosure.

FIG. 1 is a schematic diagrams illustrating an exemplary interaction system according to some embodiments of the present disclosure. As shown in FIG. 1, the interaction system 100 may include a head-mounted display device 110, a network 120, a terminal 130, a processing engine 140, and a storage 150. The connection between the components in the interaction system 100 may be variable. Merely by way of example, as illustrated in FIG. 1, the head-mounted display device 110 may be directly connected to the processing engine 140 and/or be connected to the processing engine 140 through the network 120.

The head-mounted display device 110 (or referred to as a HMD 110) may refer to a device that may be worn on a user's face and/or head to provide interaction with a user 115. In some embodiments, the HMD 110 may collect information. For example, the HMD 110 may include a sensor which may collect information related to the user. Detailed description may be found elsewhere in the present disclosure. In some embodiments, the HMD 110 may be implemented by an application (e.g., a game application, a social application, a shopping application, etc.) to interact with the user 115. The HMD 110 may interact with the user 115 though virtual contents displayed, for example, on the HMD 110. As used herein, the virtual contents may include objects that may not exist in the real world. The virtual contents may include text, image, audio information, etc. Merely by way of example, the virtual contents may include a virtual character that may perform communicative functions with a user 115. The virtual character may include a virtual person, a virtual humanoid, a virtual human face, or a virtual creature, or the like, or any combination thereof. As another example, the virtual contents may include an audio message that may be provided to a user 115. As another example, the virtual contents may include a text information that may be displayed on a display device (e.g., the HMD 110).

In some embodiments, the HMD 110 may include an eyeglass, a helmet, a smart glasses, a smart helmet, a smart visor, a smart face shield, a smart contact lenses, a virtual reality device, an augmented reality device, or the like, or any combination thereof. For example, the HMD 110 may include a Google Glass™, an Oculus Rift™, a Hololens™, a Gear VR™, etc. In some embodiments, the HMD 110 may connect to the processing engine 140, and transmit information to or receive information from the processing engine 140.

The user 115 may be a user of an application implemented on the HMD 110. The user 115 may be a human user (e.g., a human being), a machine user (e.g., a computer configured by a software program to interact with the HMD 110), or any suitable combination thereof (e.g., a human assisted by a machine or a machine supervised by a human). The user 115 is not part of the interaction system 100, but is associated with the HMD 110.

The network 120 may include any suitable network that can facilitate the exchange of information and/or data for the interaction system 100. In some embodiments, one or more components of the interaction system 100 may communicate information and/or data with one or more other components of the interaction system 100 via the network 120. For example, the processing engine 140 may obtain information from the HMD 110 via the network 120. As another example, the processing engine 140 and/or the HMD 110 may obtain user instructions from the terminal(s) 130 via the network 120. The network 120 may be and/or include a public network (e.g., the Internet), a private network (e.g., a local area network (LAN), a wide area network (WAN)), etc.), a wired network (e.g., an Ethernet network), a wireless network (e.g., an 502.11 network, a Wi-Fi network, etc.), a cellular network (e.g., a Long Term Evolution (LTE) network), a frame relay network, a virtual private network ("VPN"), a satellite network, a telephone network, routers, hubs, witches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or Internet exchange points through which one or more components of the Interaction system 100 may be connected to the network 120 to exchange data and/or information.

The terminal(s) 130 may include a mobile device 131, a tablet computer 132, a laptop computer 133, or the like, or any combination thereof. In some embodiments, the mobile device 131 may include a smart home device, a wearable device, a mobile device, a virtual reality device, an augmented reality device, or the like, or any combination thereof. In some embodiments, the terminal 130 may be connected to the HMD 110, and display information transmitted therefrom. For example, the terminal 130 may display an expression of the user, a virtual character (e.g., a game character), or the like or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 130 may be part of the processing engine 140.

Figure 2:
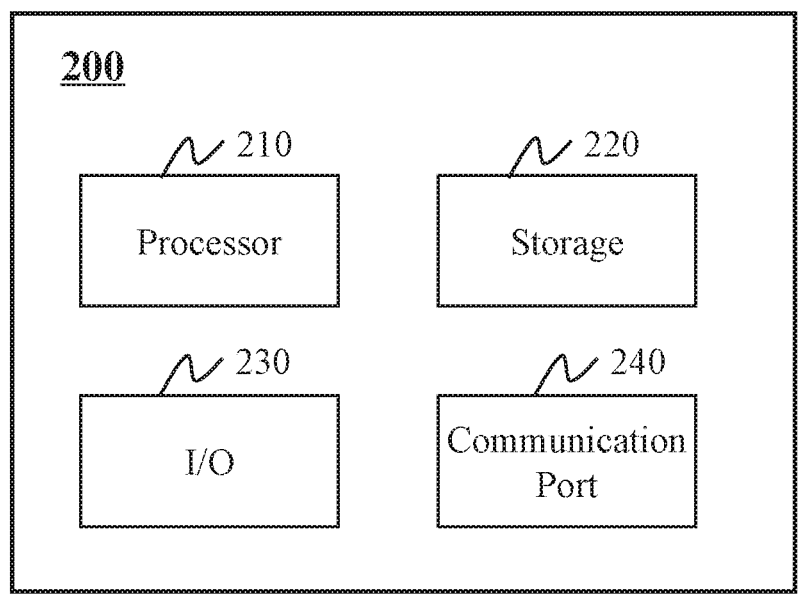
FIG. 2 is a schematic diagram illustrating an exemplary computing device on which the medical imaging system can be implemented, according to some embodiments of the present disclosure.

The processing engine 140 may process data and/or information obtained from the HMD 110, the terminal(s) 130, and/or the data storage 150. For example, the processing engine 140 may process information from the HMD 110. The information may be collected by the HMD 110 or may be input by a user 115 though the HMD 110. As another example, the processing engine 140 may generate an instruction based on the received information. The generated instruction may further be sent to and executed by the HMD 110. In some embodiments, the processing engine 140 may be a single server or a server group. The server group may be centralized or distributed. In some embodiments, the processing engine 140 may be local or remote. For example, the processing engine 140 may access information and/or data stored in the HMD 110, the terminal(s) 130, and/or the data storage 150 via the network 120. As another example, the processing engine 140 may be directly connected to the HMD 110, the terminal(s) 130 and/or the data storage 150 to access stored information and/or data. In some embodiments, the processing engine 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing engine 140 may be implemented by a computing device 200 having one or more components as illustrated in FIG. 2.

The data storage 150 may store data, instructions, and/or any other information. In some embodiments, the data storage 150 may store data obtained from the terminal(s) 130 and/or the processing engine 140. In some embodiments, the data storage 150 may store data and/or instructions that the processing engine 140 may execute or use to perform exemplary methods described in the present disclosure. In some embodiments, the data storage 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk; an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the data storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the data storage 150 may be connected to the network 120 to communicate with one or more other components in the interaction system 100 (e.g., the processing engine 140, the terminal(s) 130, eta). One or more components of the Interaction system 100 may access the data or instructions stored in the data storage 150 via the network 120. In some embodiments, the data storage 150 may be directly connected to or communicate with one or more other components in the Interaction system 100 (e.g., the processing engine 140, the terminal(s) 130, etc.). In some embodiments, the data storage 150 may be part of the processing engine 140.

This description is intended to be illustrative, and not to limit the scope of the present disclosure. Many alternatives, modifications, and variations will be apparent to those skilled in the art. The features, structures, methods, and characteristics of the exemplary embodiments described herein may be combined in various ways to obtain additional and/or alternative exemplary embodiments. However, those variations and modifications do not depart the scope of the present disclosure. For example, the processing engine 140 may be omitted, and the function of the processing engine 140 may be realized by a processor 430 implemented on the HMD 110.

FIG. 2 is a schematic diagram illustrating exemplary hardware and/or software components of an exemplary computing device on which the processing engine 140 may be implemented according to some embodiments of the present disclosure. As illustrated in FIG. 2, the computing device 200 may include a processor 210, a storage 220, an input/output (I/O) 230, and a communication port 340.

The processor 210 may execute computer instructions (e.g., program code) and perform functions of the processing engine 140 in accordance with techniques described herein. The computer instructions may include, for example, routines, programs, objects, components, data structures, procedures, modules, and functions, which perform particular functions described herein. For example, the processor 210 may process medical data obtained from the scanner 110, the terminal 130, the storage device 150, and/or any other component of the medical system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor 210 of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the scanner 110, the terminal 130, the storage device 150, and/or any other component of the medical imaging system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage may store one or more programs and/or instructions to perform exemplary methods described in the present disclosure. For example, the storage may store a program for the processing engine 130 for determining a regularization item.

The I/O 230 may input and/or output signals, data, information, etc. In some embodiments, the I/O 230 may enable a user interaction with the processing engine 140. In some embodiments, the I/O 230 may include an input device and an output device. Examples of the input device may include a keyboard, a mouse, a touch screen, a microphone, or the like, or any combination thereof. Examples of the output device may include a display device, a loudspeaker, a printer, a projector, or the like, or any combination thereof. Examples of the display device may include a liquid crystal display (LCD), a light-emitting diode (LED)-based display, a flat panel display, a curved screen, a television device, a cathode ray tube (CRT), a touch screen, or the like, or any combination thereof.

The communication port 240 may be connected to a network (e.g., the network 120) to facilitate data communications. The communication port 240 may establish connections between the processing engine 140 and the scanner 110, the terminal 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee™ link, a mobile network link (e.g., 3G, 4G, 5G, etc.), or the like, or any combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Those skilled in the art will recognize that the present teachings are amenable to a variety of modifications and/or enhancements. For example, although the implementation of various components described herein may be embodied in a hardware device, it may also be implemented as a software only solution, for example, an installation on an existing server. In addition, the processing engine 130 as disclosed herein may be implemented as a firmware, firmware/software combination, firmware/hardware combination, or a hardware/firmware/software combination.

Figure 3:
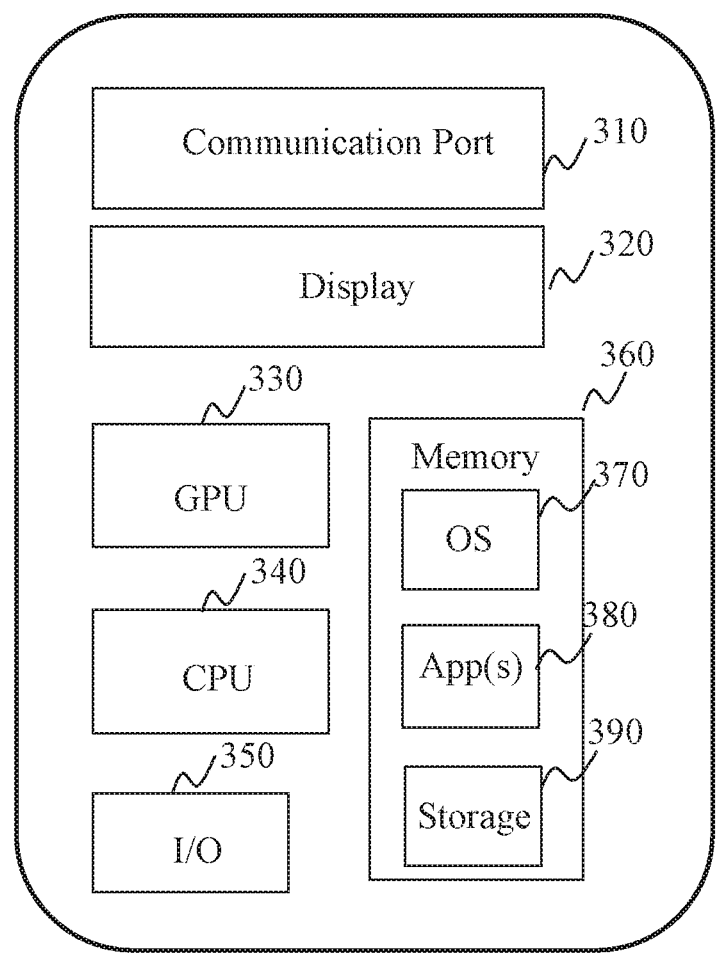
FIG. 3 is a schematic diagram illustrating exemplary hardware and/or software components of an exemplary mobile device on which the terminal may be implemented according to some embodiments of the present disclosure.

FIG. 3 is a schematic diagram illustrating exemplary hardware and/or software components of an exemplary mobile device 300 on which the terminal 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing engine 140. User interactions with the information stream may be achieved via the I/O 350 and provided to the processing engine 140 and/or other components of the medical imaging system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
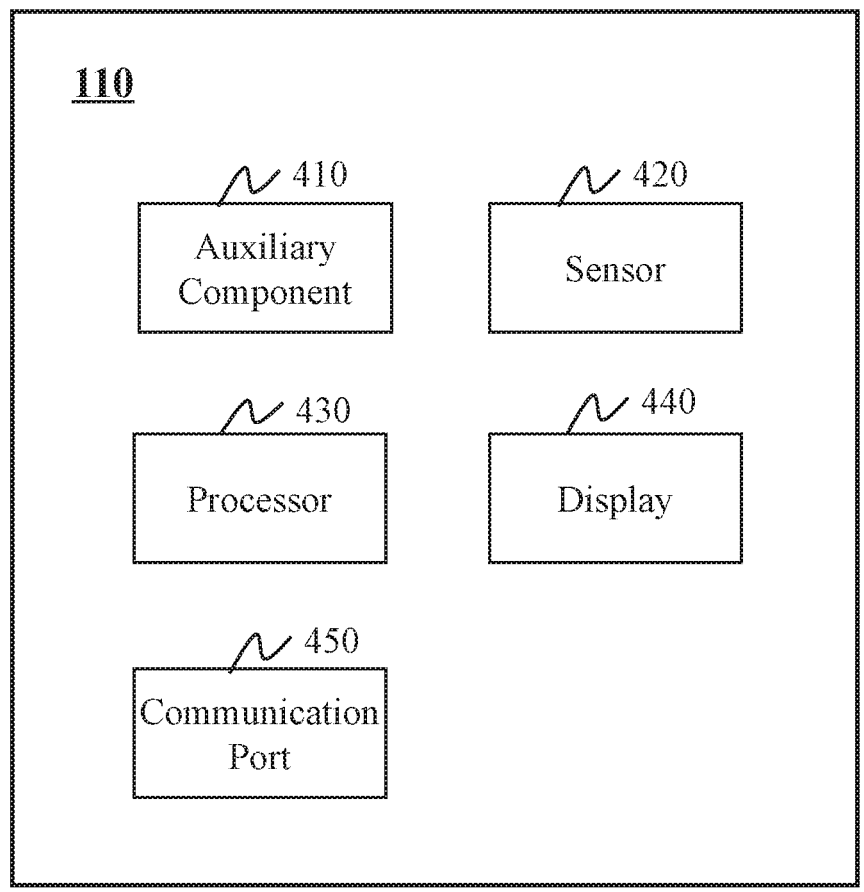
FIG. 4 is a block diagram illustrating an exemplary head-mounted display device 110 according to some embodiments of the present disclosure.

FIG. 4 is a block diagram illustrating an exemplary head-mounted display device 110 according to some embodiments of the present disclosure. As illustrated in FIG. 4, the HMD 110 may include an auxiliary component 410, a sensor 420, a processor 430, a display 440, and a communication port 450. More or less components may be included in the head-mounted display device without loss of generality. For example, two of the units may be combined into a single unit, or one of the units may be divided into two or more units. In one implementation, one or more of the units may reside on a same or different computing devices (e.g., different server computers).

A user 115 may wear the HMD 110 on through the auxiliary component. In some embodiments, the auxiliary component 410 may be worn on the user's face or head. Merely by way of example, the auxiliary component 410 may include an eyeglass, a helmet, a visor, a face shield, a contact lenses, or the like or any combination thereof.

The sensor 420 may be configured to collect information related to the user and conditions ambient to the HMD 110. As used herein, the information related to the user may also be referred to as user information, and the conditions ambient to the HMD 110 may also be referred to as context information. In some embodiments, the user information may include physiological information of the user and information input by the user 115. For example, the user information may include a heart rate of the user, a blood pressure of the user, brain activity of the user, biometric data related to the user, a facial image of the user, an expression of the user, an action performed by the user, or an audio given out by the user. As another example, the user information may include information input by the user through an input device including a keyboard, a mouse, a microphone, or the like, or any combination thereof. In some embodiments, the context information may include data of the ambient environment of the HMD 110. Exemplary context information may include an ambient temperature, an ambient humidity level, an ambient pressure, a geographic location of the HMD, an orientation and position of the HMD. In some embodiments, the sensor 420 may acquire user information (e.g., a facial image of the user) in real time.

In some embodiments, the sensor 420 may include an image sensor (e.g., a camera), an audio sensor (e.g., a microphone), a location sensor, a humidity sensor, a biometric sensor, an ambient light sensor, or the like or any combination thereof. Merely by way of example, the image sensor may be configured to collect a facial image of the user, and the microphone may be configured to collect audio message given out by the user, and the location sensor may be configured to collect at least one of the geographic location of the HMD, the orientation of the HMD, or the position of the HMD 110. In some embodiments, the sensor 420 may be connected to or communicate with the processing engine 140, and transmit the collected information (e.g., the user information and/or the context information) to the processor 430.

The processor 430 may be configured to process information and/or data received from one or more components of the interaction system (e.g., the sensor 420, the terminal 130, the storage 150, etc.). The information and/or data may include user information, registered identification information, and/or historical operation information of the user.

The processor 430 may process the received information and/or data to determine an expression of a user. As used herein, an expression of a user may refer to a look on the user's face showing the user's feeling and/or thinking. The expression may be embodied as an electrical file including a text, an image, or an instruction that can be executed by the processor 430. In some embodiments, the processor 430 may process user information to determine an expression of a user. Merely by way of example, the processor 430 may receive a facial image of the user. The processor 430 may process the facial image to generate an expression of the user.

The processor 430 may execute an operation based on the determined expression of the user. The processor 430 may execute an operation through an application or an operating system implemented on the processor 430. In some embodiments, the processor 430 may adjust at least one running parameter of the application or the operating system based on the determined expression of the user. For example, the application may be a game application, and the processor 430 may adjust a run-time length and/or a difficulty level of the game application based on the expression of the user.

The processor 430 may process the determined expression of the user to determine an emotional state of the user. As used herein, an emotional state may refer a state of the user's emotions (e.g., arousal, concentration, interest, emotion, tension, etc.). The processor 430 may provide a feedback based on the determined emotional state of the user. For example, the processor 430 may provide a set of options related to the determined emotional state for the user to choose and receive a choice from the user. As another example, the processor may adjust a running parameter of an application or an operating system based on the emotional state.

The processor 430 may generate a first image based on the determined expression of the user, wherein the first image comprises at least one of an image of nose of the user, an image of mouth of the user, an image of an ear of the user, an image of an eye of the user, or an image of an eyebrow of the user. In some embodiments, the processor 430 may further generate at least part of a virtual character related to the user based on the first image. In some embodiments, the processor 430 may further update a second image (e.g., a virtual facial image of the user, a cartoon facial image of the user, or a realistic facial image of the user) that may be used to represent the user in an application or an operating system.

The processor 430 may be implemented by one or more applications. For example, the processor 430 may be implemented by a game application. As used herein, an application may refer to a computer program stored on a computer readable storage media, such as a CD disc, diskette, tape, or other media. An operating system (OS) may refer to a system software that manages computer hardware and software resources. Exemplary operating systems may include any version or variation of an Android operating system, a Unix and Unix-like operating systems, a Mac operating system, a Linux operating system, a BlackBerry operating system, a Microsoft Windows operating system comprising Windows 95, Windows 98, Windows NT, Windows 2000, Windows ME, Windows XP and others. The application or the operating system may be adjusted based on the expression of the user. Detailed adjustment may be found elsewhere in the present disclosure.

The processor 430 may process received information and/or data to determine an identification of a user. In some embodiments, the processor 430 may process a facial image or biological information of the user to determine the identification of the user. In some embodiments, the processor 430 may determine that the identification of the user is a registered identification.

The display 440 may display information. Merely by way of example, the display 440 may display expression of the user, a game character, a game prop, and a scene of the game. As another example, the display 440 may display a plurality of choices including sentences and/images, from which a user may make a choice, and thus an interaction between the virtual character and the user may be accomplished.

In some embodiments, the display 440 may be a screen implemented on the HMD. In some embodiments, the display 440 may be a transparent display such as in the visor or face shield of a helmet. In some embodiments, the display 440 may be display lens distinct from the visor or face shield of the helmet.

The communication port 450 may establish connections between the processor 430 and one or more other components in the interaction system and an external device. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee™ link, a mobile network link (e.g., 3G, 4G, 5G, etc.), or the like, or any combination thereof. In some embodiments, the communication port 450 may be and/or include a standardized communication port, such as RS232, RS485, etc. In some embodiments, the communication port may be a specially designed communication port. For example, the communication port 450 may be designed in accordance with the digital imaging and communications in medicine (DICOM) protocol.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the display 440 may locate outside the HMD 110. As another example, the processor 430 may be implemented on one or more components of the interaction system 100 (e.g., the terminal 130, or the processing engine 140, etc.) which may connect to or communicate with the HMD 110, rather than on the HMD 110.

Figure 5:
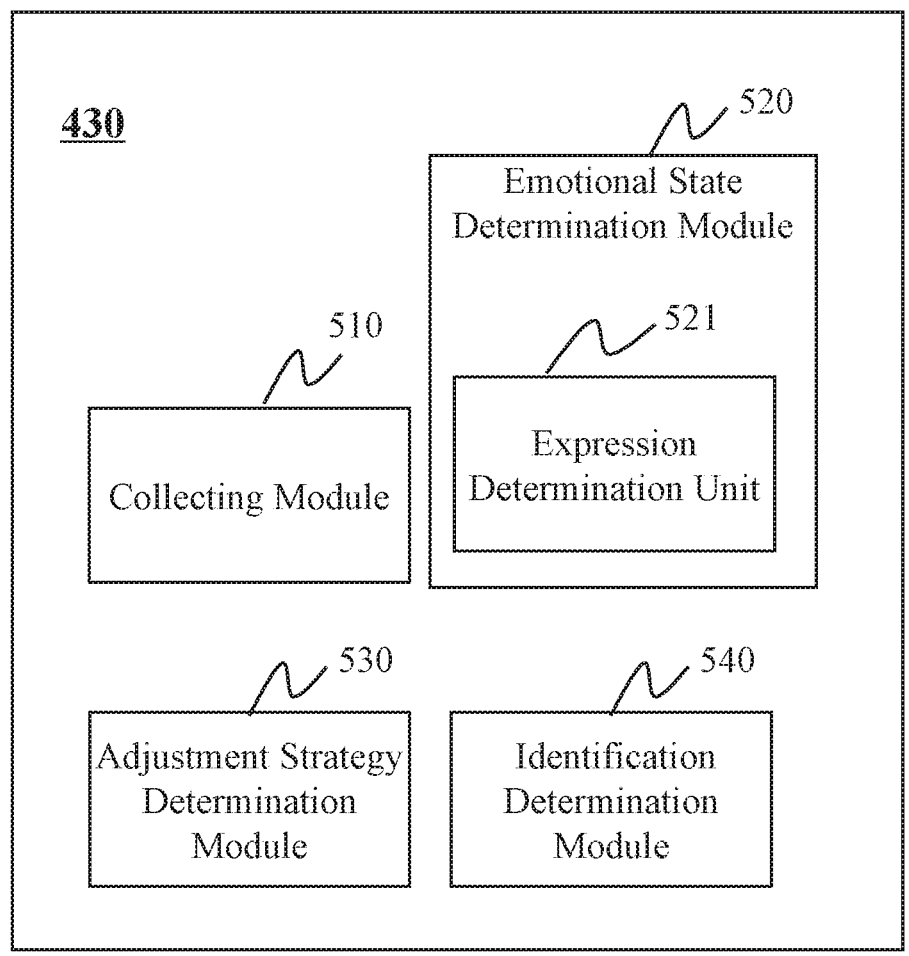
FIG. 5 is a block diagram illustrating an exemplary processor 430 according to some embodiments of the present disclosure.

FIG. 5 is a block diagram illustrating an exemplary processor 430 according to some embodiments of the present disclosure. As illustrated in FIG. 5, the processor 430 may include a collecting module 510, an emotional state determination module 520, an adjustment strategy determination module 530, and an identification determination module 540. More or less components may be included in the processor without loss of generality. For example, two of the units may be combined into a single unit, or one of the units may be divided into two or more units. In one implementation, one or more of the units may reside on a same or different computing devices (e.g., different server computers). The collecting module 510, the emotional state determination module 520, the adjustment strategy determination module 530, and the identification determination module 540 may be implemented on the processor 430. In some embodiments according to the present disclosure, the collecting module 510 may be implemented on the sensor 420 of the processor 430.

The collecting module 510 may be connected to the emotional state determination module 520 and/or the identification determination module 540. The collecting module 510 may be configured to collect user information including a facial image of a user, biological information of a user, an action of a user, a voice of a user and/or information input by the user via a manipulator. The collecting module 510 may be configured to transmit the facial image of the user, the biological information of the user, the action of the user, the voice of the user and/or the information input by the user via the manipulator to the emotional state determination module 520 and/or the identification determination module 540. For example, the facial image of the user may include an image of a facial organ, an image of a facial point, an image of a facial line, an image of a facial wrinkle, etc. As another example, the biological information of the user may include facial information of the user, pupil information of the user, heart-beat information, etc. In some embodiments, the collecting module 510 may collect user information when a trigger condition is satisfied. For example, the collecting module 510 may collect user information once the user presses a trigger button. As another example, the collecting module 510 may collect user information once it detects a human face. In some embodiments, the collecting module 510 may collect a reference image for further determine an expression of the user. The reference image may include an image reflecting a normal expression of the user (e.g., an expressionless facial image of the user).

The emotional state determination module 520 may be connected to the adjustment strategy determination module 530. The emotional state determination module 520 may be configured to receive and analyze the user information (e.g., the facial image of the user, biological information of the user, the action of the user, the voice of the user and/or information input by the user via the manipulator) collected by the collecting module 510 to determine an emotional state of the user. The emotional state determination module 520 may include an expression determination unit 521. The expression determination unit 521 may be configured to determine an expression of the user at least based on a facial image of the user.

In some embodiments, the expression determination unit 521 may process a facial image of the user, which may comprise at least one of an image of a facial organ, an image of a facial point, an image of a facial line, or an image of a facial wrinkle, to determine an expression of the user. For example, the expression determination unit 521 may acquire a first facial image of the user, and determine the expression of the user based on the first facial image of the user. As another example, the expression determination unit 521 may determine the expression of the user based on at least one facial image of the user, and a neural network. For example, the expression determination unit 521 may acquire a neural network, and determine the expression of the user based on the neural network and the first facial image of the user. Specifically, for example, the expression determination unit 521 may extract a first feature from the facial image of the user, and determine the expression of the user based on the neural network and the extracted first feature. As another example, the expression determination unit 521 may further obtain a second facial image of the user, the second facial image of the user being behind the first facial image of the user in terms of time, and determine the expression of the user based on the neural network, the first facial image of the user, and the second facial image of the user. To determine the expression of the user based on the neural network, the first facial image of the user, and the second facial image of the user, the expression determination unit 521 may extract a first feature from the first facial image, the first feature corresponding to a facial point of the user, extract a second feature from the second facial image, the second feature corresponding to the facial point of the user, determine a movement of the facial point of the user based on the extracted first feature and the second feature, and determine the expression of the user based on the neural network and the determined movement of the facial point of the user.

The expression determination unit 521 may process the facial image and/or biological information of the user to determine an expression of the user. In some embodiments, the expression determination unit 521 may obtain a reference image from a storage which includes a pattern recognition database. The pattern recognition database may include information that may be used to determine an expression of the user by employing a pattern recognition method. Detailed description of the pattern recognition method may be found elsewhere in the present disclosure. The storage may be implemented on an internal data source of the interaction system 100 (e.g., the collecting module 510 or the storage 150) or an external data source connected to the interaction system 100 via the network (e.g., a cloud database).

The expression determination unit 521 may be configured to determine the expression of the user by employing a pattern recognition method. For example, the expression determination unit 521 may be configured to extract a first mapping image corresponding to a facial point of the user from the reference image and extract a second mapping image corresponding to the facial point of the user from the facial image. The expression determination unit 521 may map the first mapping image with the second mapping image to determine the expression of the user. In some embodiments, the expression determination unit 521 may determine the expression of the user based on a neural network. As used herein, a neural network may refer to a computing system made up of a number of simple, highly interconnected processing elements, which process information by their dynamic state response to external inputs. Exemplary neural networks may include a deep neural network (DNN), a recurrent neural network (RNN), a deep belief network (DBN). The expression determination unit 521 may extract a feature from the facial image and determine the expression of the user based on the neural network. In some embodiments, the expression determination unit 521 may obtain two or more facial images sequentially in terms of time. The expression determination unit 521 may extract a feature corresponding to a facial point of the user from each of the two or more facial images. The expression determination unit 521 may determine a movement of the facial point of the user based on the extracted features, and determine the expression of the user based on the neural network and the movement of the facial point. The processor 430 may store the determined expression of the user in a data source (e.g., the storage 150). The processor 430 may update the neural network model based on the determined expression of the user.

In some embodiments; the expression determination unit 521 may transmit the expression of the user to an internal display of the HMD 110 (e.g., the display 440), or an external display connected to the HMD 110. The expression may be embodied in a virtual character to be presented in the display. In some embodiments, the expression determination unit 521 may transmit the expression of the user to an external device (e.g., an external host, a cloud server).

In some embodiments, the emotional state determination module 520 may determine the emotional state of the user based on the determined expression of the user. The emotional state of the user may include an emotion type and/or a level of the emotion. Merely by way of example, when the expression determination unit 521 determine an expression of frown of the user, the emotional state determination module 520 may determine that the user may be in a state of tension. The emotional state determination module 520 may determine a level of tension based on a degree of frown of the user. In some embodiments, the emotional state determination module 520 may determine the emotional state of the user based on the biological information of the user (e.g.; facial information, pupil information, and heart-beat information). For example, when the heart-beat rate of the user rises, the emotional state determination module 520 may determine that the user may be in a state of arousal. As another example, when the pupil of the user dilates (i.e., mydriasis), the emotional state determination module 520 may determine that the user may be in a state of tension. The emotional state determination module 520 may determine a level of tension based on the dilation degree of pupil of the user.

Figure 12A:
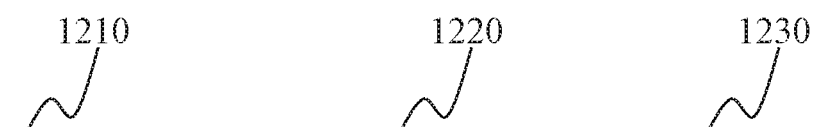
FIGS. 12A, 12B and 12C are schematic diagrams illustrating exemplary look-up tables of determining adjustment strategy for a game application according to some embodiments of the present disclosure.
Figure 12B:
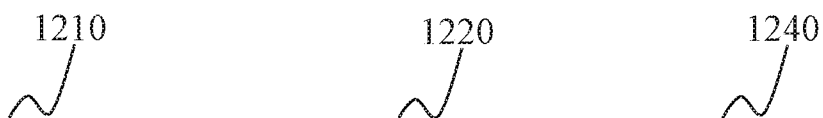
Figure 12C:
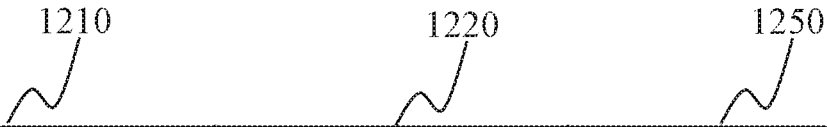

The adjustment strategy determination module 530 may be configured to determine an adjustment strategy. The adjustment strategy may relate to adjusting a running parameter of an application or an operating system. The adjustment strategy determination module 530 may determine the adjustment strategy based on the determined expression and/or emotional state of the user, which may provide a better experience for the user to interact with the application or the operating system. In some embodiments, the adjustment strategy determination module 530 may determine the adjustment strategy based on a look-up table reflecting a relationship among the biological information, the emotional state and the adjustment strategy (as illustrated in FIG. 12A, 12B, 12C). In some embodiments, the adjustment strategy determination module 530 may obtain historical information (e.g., one or more operation habits) of the user from a data source and determine the adjustment strategy based on the historical information. For example, if the historical information indicates that the user used to operate in a smooth mode, the adjustment strategy determination module 530 may determine a smooth adjustment strategy. As another example, if the historical information indicates that the user tended to take adventures, the adjustment strategy determination module 530 may determine a challenging adjustment strategy. In some embodiments, the adjustment strategy determination module 530 may determine a strategy for adjusting a run-time length, a rate of progress and/or a difficulty level of a game application.

FIGS. 12A, 12B and 12C are schematic diagrams illustrating exemplary look-up tables of determining adjustment strategy for a game application according to some embodiments of the present disclosure. Merely by way of example, the user may be playing the game "Plants vs. Zombies". As illustrated in FIG. 12A, the collecting module 510 may collect a heart rate 1210 of the user. The emotional state determination module 520 may determinate a tension level 1220 of the user. The adjustment strategy determination module 530 may determine an adjustment strategy for adjusting a zombie number. A higher heart rate may indicate a higher tension level of the user, which may require a lower difficulty level of the game. A smaller zombie number may indicate a lower difficulty level. For example, if the heart rate of the user is no larger than 100/min, the emotional state determination module 520 may determine that the tension level of the user is normal, and the adjustment strategy determination module 530 may determine to adjust the zombie number as 20; if the heart rate of the user is between 100/min and 130/min, the emotional state determination module 520 may determine that the tension level of the user is high, and the adjustment strategy determination module 530 may determine to adjust the zombie number as 8; if the heart rate of the user is no smaller than 130/min, the emotional state determination module 520 may determine that the tension level of the user is over high, and the adjustment strategy determination module 530 may determine to adjust the zombie number as 0.

Similarly with FIG. 12A, as illustrated in FIG. 12B, the collecting module 510 may collect a heart rate 1210 of the user. The emotional state determination module 520 may determinate a tension level 1220 of the user. The adjustment strategy determination module 530 may determine an adjustment strategy for adjusting a zombie value. For example, if the heart rate of the user is no larger than 100/min, the emotional state determination module 520 may determine that the tension level of the user is normal, and the adjustment strategy determination module 530 may determine to adjust the zombie value as 20; if the heart rate of the user is between 100/min and 130/min, the emotional state determination module 520 may determine that the tension level of the user is high, and the adjustment strategy determination module 530 may determine to adjust the zombie value as 8; if the heart rate of the user is no smaller than 130/min, the emotional state determination module 520 may determine that the tension level of the user is over high, and the adjustment strategy determination module 530 may determine to adjust the zombie value as 0.

Similarly with FIGS. 12A and 12B, as illustrated in FIG. 12C, the collecting module 510 may collect a heart rate 1210 of the user. The emotional state determination module 520 may determinate a tension level 1220 of the user. The adjustment strategy determination module 530 may determine an adjustment strategy for adjusting a run-time length and a zombie value. For example, if the heart rate of the user is no larger than 100/min, the emotional state determination module 520 may determine that the tension level of the user is normal, and the adjustment strategy determination module 530 may determine to adjust the run-time length as "no restriction" and the zombie number as 20; if the heart rate of the user is between 100/min and 130/min, the emotional state determination module 520 may determine that the tension level of the user is high, and the adjustment strategy determination module 530 may determine to adjust the run-time length as 4 hours and the zombie number as 8; if the heart rate of the user is no smaller than 130/min, the emotional state determination module 520 may determine that the tension level of the user is over high, and the adjustment strategy determination module 530 may determine to adjust the run-time length as 0.5 hour and the zombie number as 0.

The identification determination module 540 may be configured to receive and analyze the user information (e.g., the facial image of the user, biological information of the user, the action of the user, the voice of the user and/or information input by the user via the manipulator) collected by the collecting module 510 to determine an identification of the user. In some embodiments, the identification determination module 540 may authenticate the identification of the user as a registered identification. For example, the identification determination module 540 may receive and analyze the biological information of the user (e.g., facial information of the user, pupil information of the user, hand vein information of the user, fingerprint information of the user) to determine an identification of the user, and authenticate the identification of the user as a registered identification. The authentication as a registered identification may enable an operation automatically. For example, the authentication as a registered identification may enable the user log in an application or an operating system without inputting his/her user name and password. As another example, the authentication as a registered identification may authorize a payment by the user without entering a payment code.

The processor 430 may read historical information associated with the identification of the user from a data source, and execute an operation based on the historical information. For example, the processor may read historical settings and/or progress of the application or the operating system of the user, and activate the application or the operating system based on the historical settings and/or progress. As another example, the processor 430 may read historical data, e.g., "the user often chooses to play as a certain character in a game application". When the user logs in the game application, the processor 430 may recommend a toy representing the character for purchasing to the user. The processor 430 may obtain initial application settings, initial operating system settings, history application settings, history operating system settings of the user. The processor 430 may store the biological information or the emotional state of the user under the identification of the user as an electrical file (or referred to as digital file), which may be used for further operation related to the user.

Figure 6:
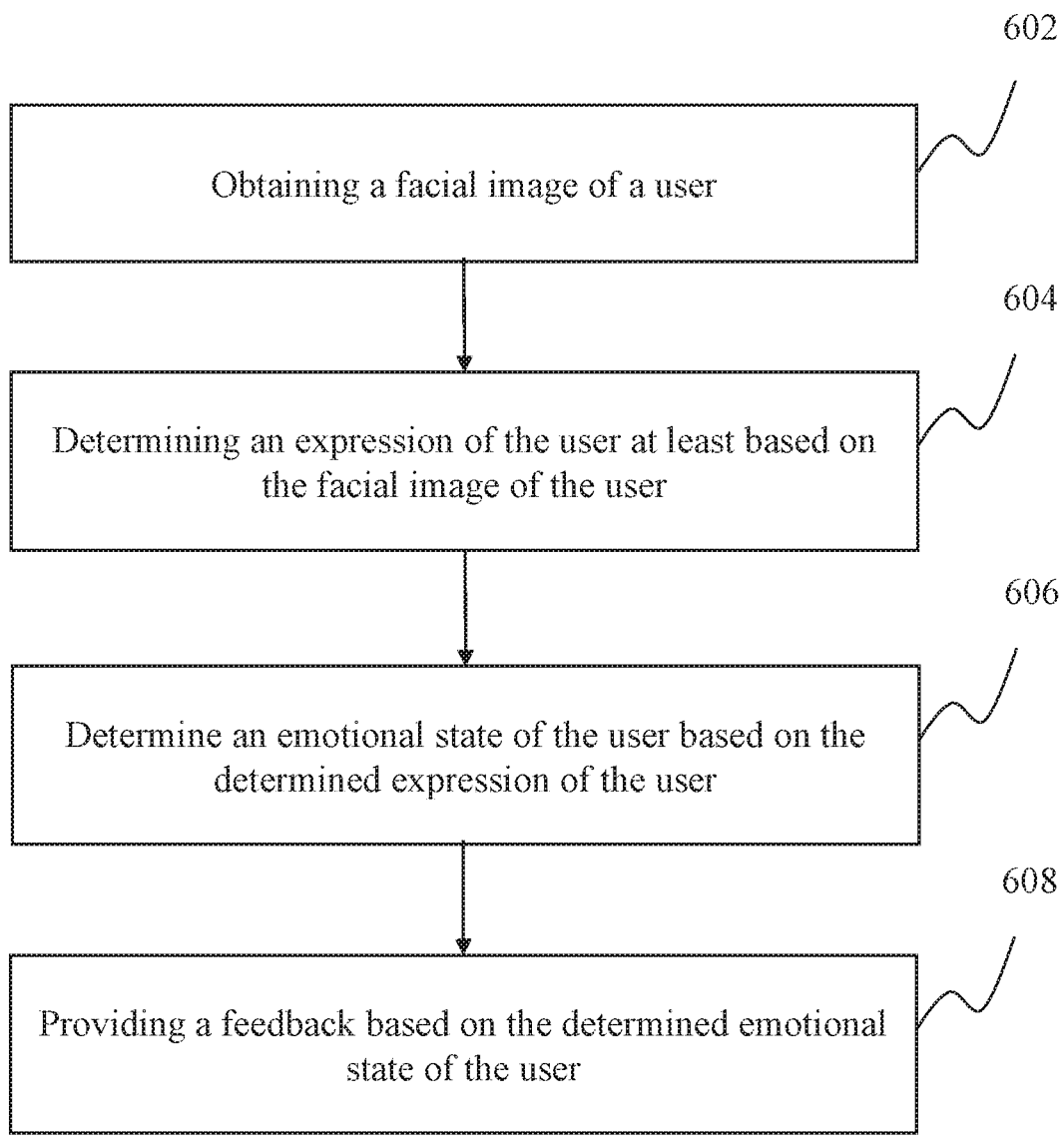
FIG. 6 is a flowchart illustrating an exemplary process for determining an emotional state of a user according to some embodiments of the present disclosure.

FIG. 6 is a flowchart illustrating an exemplary process for determining an emotional state of a user according to some embodiments of the present disclosure. The process, or a portion thereof, may be implemented on a computing device as illustrated in FIG. 2 or a mobile device as illustrated in FIG. 3. For illustration purposes, the following description is provided with reference to the interaction system 100 as illustrated in FIG. 1. As already described, the interaction system 100 includes a HMD 110 including a processor 430 (as illustrated in FIGS. 4 and 5).

In 602, processor 430 may obtain a facial image of a user. The collecting module 510 may receive the facial image of the user from one or more components of the interaction system 100. The collecting module 510 may transmit the facial image to emotional state determination module 520. In some embodiments, the processor 430 may obtain the facial image of the user in response to a determination that a trigger condition is satisfied. In some embodiments, the collecting module 510 may obtain a reference image for further determine an expression of the user.

In 604, the processor 430 may determine an expression of the user at least based on the facial image of the user. The expression determination unit 521 may process the facial image to determine the expression of the user. In some embodiments, the expression determination unit 521 may obtain a reference image. The expression determination unit 521 may map the facial image with the reference image to determine the expression of the user. In some embodiments, the expression determination unit 521 may extract a feature from the facial image and determine the expression of the user based on a neural network. The processor 430 may store the determined expression of the user in a data source (e.g., the storage 150). The processor 430 may update the neural network based on the determined expression of the user.

In 606, the processor 430 may determine an emotional state of the user based on the determined expression of the user. The emotional state determination module 520 may process the expression of the user to determine the emotional state of the user. The emotional state determination module 520 may determine an emotion type and/or a level of the emotion. Merely by way of example, when the expression determination unit 521 determine an expression of frown of the user, the emotional state determination module 520 may determine that the user may be in a state of tension.

In 608, the processor 430 may provide a feedback based on the determined emotional state of the user. For example, the processor 430 may provide a set of options related to the determined emotional state for the user to choose and receive a choice from the user. As another example, the adjustment strategy determination module 530 may determine an adjustment strategy (e.g., strategy for adjusting a running parameter of an application or an operating system), and the processor 430 may execute the adjustment strategy (e.g., adjust the running parameter of the application or the operating system). More descriptions regarding adjusting the running parameter may be found elsewhere in the present disclosure, for example, FIGS. 7, 12A, 12B, 12C, and the description thereof.

Figure 7:
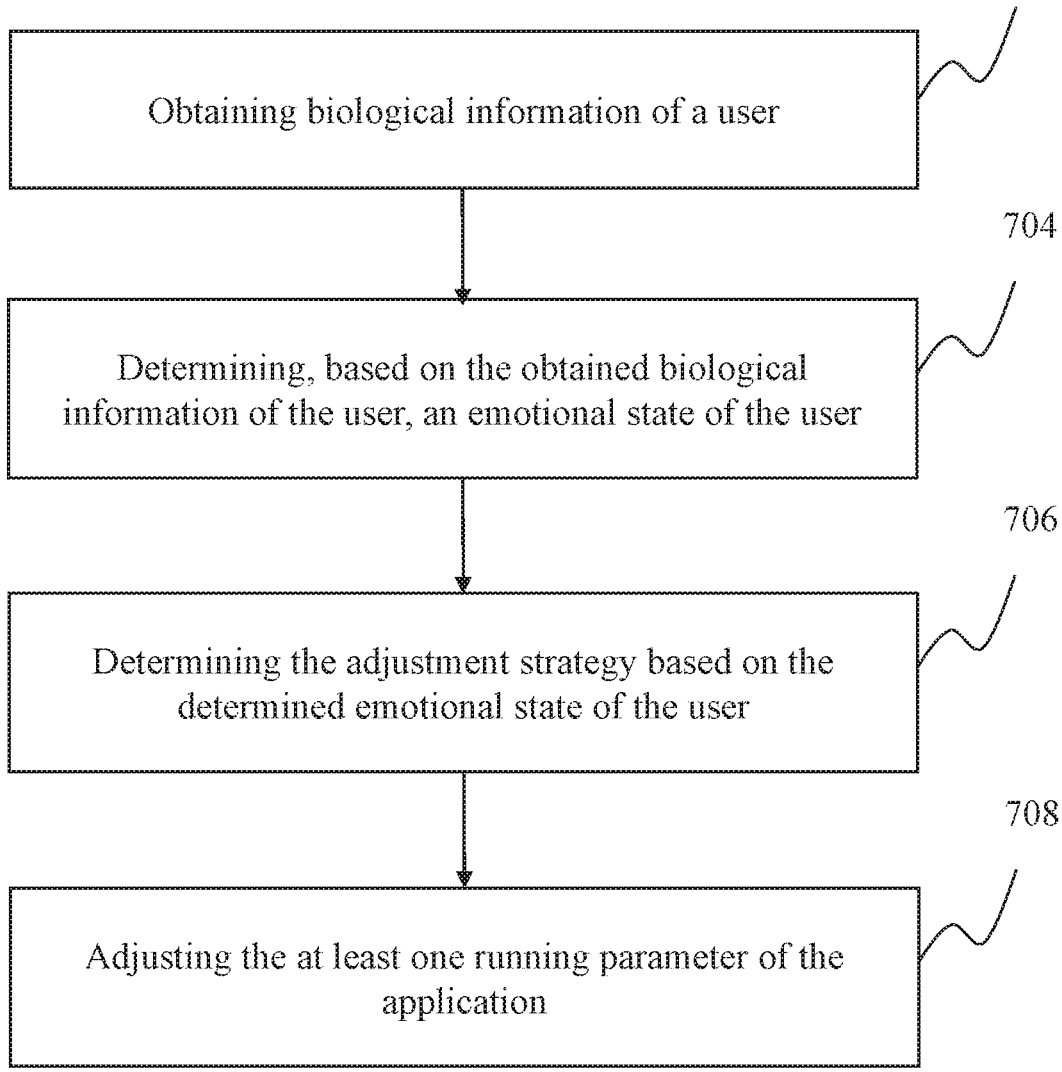
FIG. 7 is a flowchart illustrating an exemplary process for adjusting a running parameter of an application according to some embodiments of the present disclosure.

FIG. 7 is a flowchart illustrating an exemplary process for adjusting a running parameter of an application according to some embodiments of the present disclosure. The process, or a portion thereof, may be implemented on a computing device as illustrated in FIG. 2 or a mobile device as illustrated in FIG. 3. For illustration purposes, the following description is provide with reference to the interaction system 100 as illustrated in FIG. 1. As already described, the interaction system 100 includes a HMD 110 including a processor 430 (as illustrated in FIGS. 4 and 5).

In 702, the processor 430 may obtain biological information of a user. The collecting module 510 may collect biological information of the user. The collecting module 510 may transmit the biological information of the user to the emotional state determination module 520. Exemplary biological information may include facial image, pupil information, and heart-beat information.

In 704, the processor 430 may determine an emotional state of the user based on the obtained biological information. The emotional state determination module 520 may process the biological information to determine the emotional state. The emotional state of the user may include an emotion type and/or a level of the emotion. More descriptions regarding determining the emotional state of the user may be found elsewhere in the present disclosure, for example, FIGS. 5, 12A, 12B, 12C, and the description thereof.

In 706, the processor 430 may determine the adjustment strategy based on the emotional state of the user. The adjustment strategy determination module 530 may process the emotional state of the user to determine the adjustment strategy. The adjustment strategy may relate to adjusting at least one running parameter of an application or an operating system. In some embodiments, the application may be a game application, and the running parameter may be related to a run-time length, a rate of progress and/or a difficulty level of the game application. More descriptions regarding determining the adjustment strategy may be found elsewhere in the present disclosure, for example, FIGS. 5, 12A, 12B, 12C, and the description thereof.

In 708, the processor 430 may adjust the at least one running parameter of the application. The adjustment may be automatic or semi-automatic. For example, the processor 430 may adjust at least one running parameter of the application automatically based on the determined adjustment strategy. As another example, the processor 430 may provide a set of options for the user to choose based on the determined adjustment strategy, and may adjust at least one running parameter of the application based on the user's choice. As still another example, the user may modify the determined adjustment strategy, and the processor 430 may adjust at least one running parameter of the application based on the modified adjustment strategy. For example, the processor 430 may adjust a run-time length of the application, a difficulty level of the game application, an ability parameter indicative of attacking capability of non-player characters in the game application, or the like, or any combination thereof.

FIG. 8 is a flowchart illustrating an exemplary process for authenticating an identification of a user as a registered identification according to some embodiments of the present disclosure. The process, or a portion thereof, may be implemented on a computing device as illustrated in FIG. 2 or a mobile device as illustrated in FIG. 3. For illustration purposes, the following description is provide with reference to the interaction system 100 as illustrated in FIG. 1. As already described, the interaction system 100 includes a HMD 110 including a processor 430 (as illustrated in FIGS. 4 and 5).

In 802, the processor 430 may obtain biological information of a user. The collecting module 510 may collect biological information of the user. The collecting module 510 may transmit the biological information of the user to the identification determination module 540. Exemplary biological information may include a facial image, pupil information, and heart-beat information.

In 804, the processor 430 may determine an identification of the user based on the obtained biological information of the user. The identification determination module 540 may process the biological information to determine the identification of the user. Merely by way of example, the identification determination module 540 may extract one or more features from a facial image of the user, and determine the identification of the user using a trained neural network model based on the feature(s). Exemplary neural network may include a deep neural network (DNN), a recurrent neural network (RNN), a deep belief network (DBN).

In 806, the processor 430 may authenticate the identification of the user as a registered identification. In some embodiments, the identification determination module 540 may read a plurality of registered identifications from an internal data source of the interaction system 100 (e.g.; the storage 150), or an external data source connected to the interaction system 100 (e.g., a database located on a cloud), and find a registered identification matched with the identification of the user. The authentication may enable the user log in an application or an operating system without input his/her username and password. More descriptions regarding authenticating the identification of the user as a registered identification may be found elsewhere in the present disclosure, for example, FIG. 5, and the description thereof.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

Figure 9:
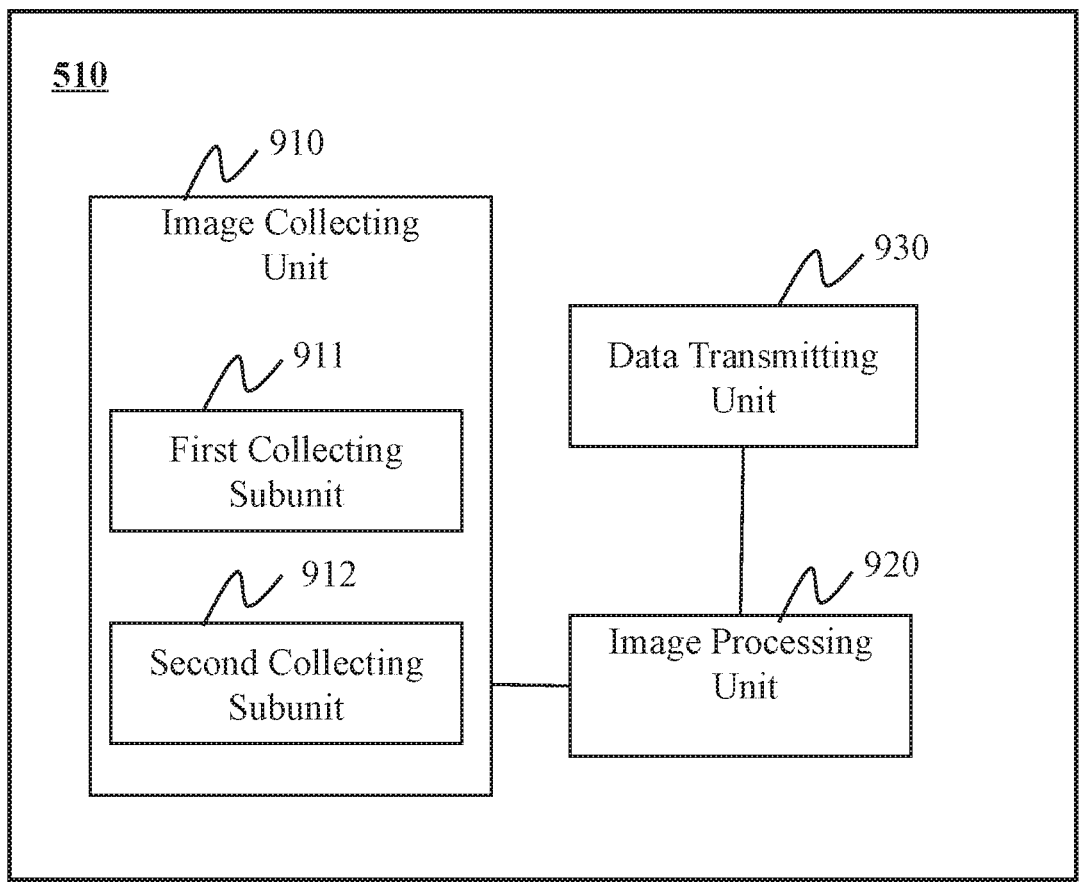
FIG. 9 is a block diagram illustrating an exemplary collecting module 510 according to some embodiments of the present disclosure.
Figure 10A:
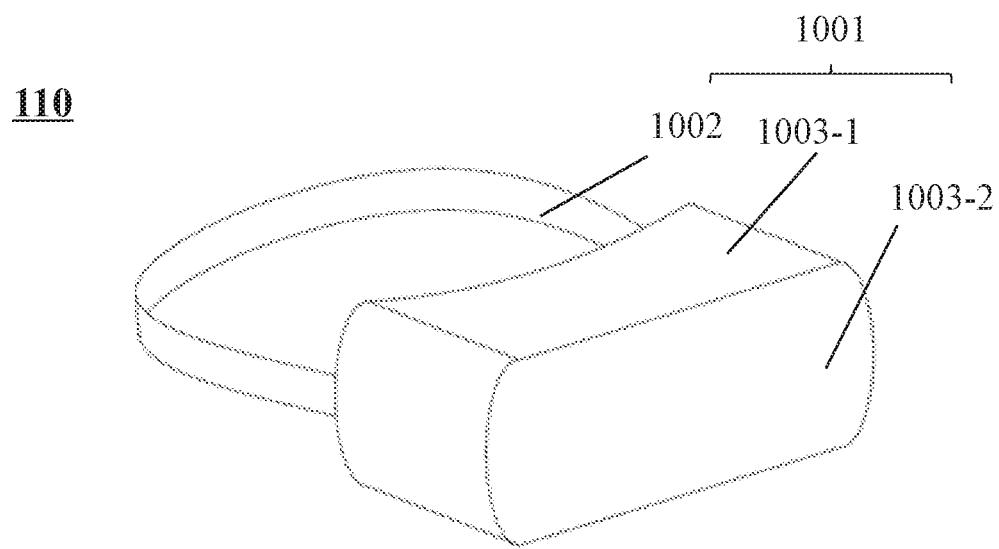
FIG. 10A is a schematic diagram illustrating an exemplary head-mounted display device according to some embodiments of the present disclosure.
Figure 10B:
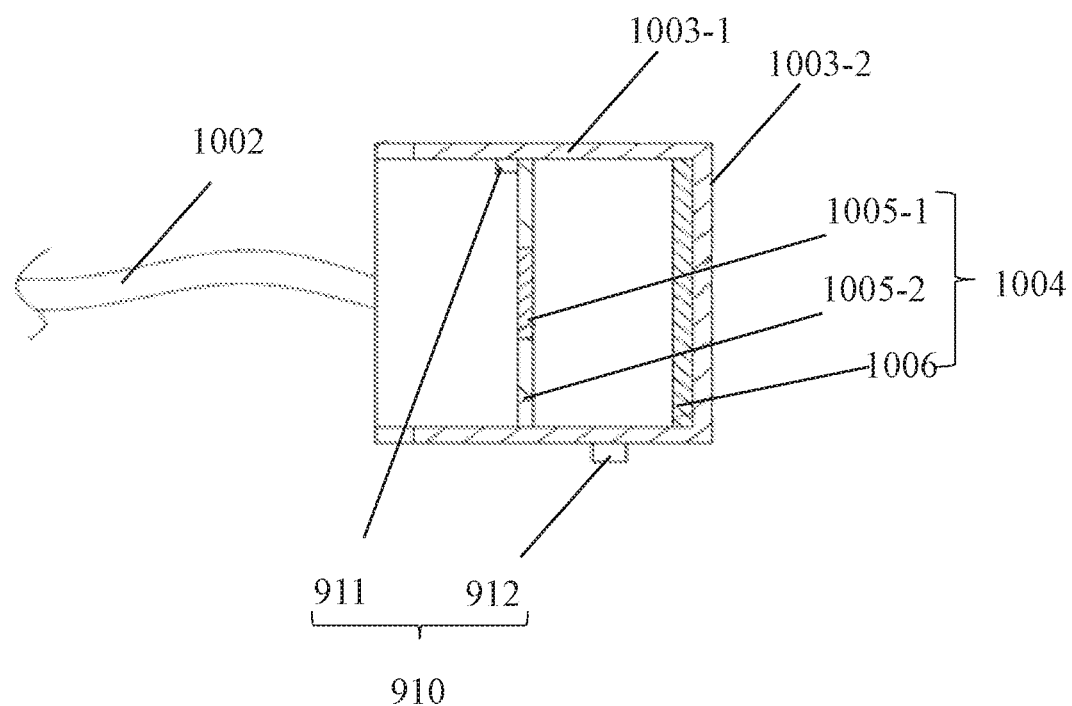
FIG. 10B is a schematic diagram illustrating cross-sectional views illustrating a head-mounted display device according to some embodiments of the present disclosure.

FIG. 9 is a block diagram illustrating an exemplary collecting module 510 according to some embodiments of the present disclosure. FIG. 10A is a schematic diagram illustrating an exemplary head-mounted display device according to some embodiments of the present disclosure. FIG. 10B is a schematic diagram illustrating cross-sectional views illustrating a head-mounted display device according to some embodiments of the present disclosure. The collecting module 510 may be implemented on the head-mounted display device. For example, the collecting module 510 may be implemented on the sensor 420 of the processor 430, which may be implemented on the head-mounted display device.

As shown in 10A, and 10B, a head-mounted display device 110 may include a mounting component 1001, and a display component 1004. The collecting module 510 may include an image collecting unit (or referred to as an image receiver) 910, an image processing unit (or referred to as image processor) 920, and a data transmitting unit 930. The image collecting unit 910 may include a first collecting sub-unit 911 (or referred to as an internal collecting sub-unit) and a second collecting sub-unit (or referred to as an external collecting sub-unit) 912.

In some embodiments, the display component 1004 may be configured on the mounting component 1001. The image collecting unit 910 may be configured on the mounting component 1001. The image collecting unit 910 may be configured to collect a facial image of a user. The image processing unit 920 may be configured on the mounting component 1001 and connected to the image collecting unit 910. The image processing unit 920 may be configured to receive, analyze and process the facial image of the user to recognize an expression of the user.

The image collecting unit 910 may collect information of a facial image of a user when the user 115 uses the head-mounted display device. The image processing unit 920 may analyze the information of the facial image and determine an emotion of the user at that moment. By collecting and analyzing the expression of the user, the head-mounted display device may better understand an intention of the user (or referred to as intention operation of the user) and improve an interactive experience of the user. Besides, it may achieve a relatively natural interaction of the user through the VR, AR or MR products. Thus, it may improve the comfort level of using the products and the competitive of the products in the market.

In some embodiments the image collecting unit 910 may include at least one camera.

In some embodiments, the camera may be configured on a plurality of locations of the mounting component 1001. The camera may collect the facial image of the user from every direction, which may cause more accurately to determine the emotion of the user. Thus it may allow the head-mounted display device to better understand the intention of the user and improve the interactive experience of the user. Besides, it may achieve a relatively natural interaction of the user 115 through the VR, AR or MR products.

In some embodiments, the camera may include an infrared camera.

In some embodiments, the infrared camera may collect clear images under a relatively dark circumstance, which may facilitate the image processing unit 920 to determine the emotion of the user. Thus it may allow the head-mounted display device to better understand the intention of the user and improve the interactive experience of the user. Besides, it may achieve a relatively natural interaction of the user 115 through the VR, AR or MR products.

It should be noted that the camera illustrated above may not only include the infrared camera, cameras that can collect a facial image of a user are within the protection scope of the present disclosure.

In some embodiments, as shown in FIG. 9, the head-mounted display device may include a data transmitting unit 930.

In some embodiments, the data transmitting unit 930 may be configured on the mounting component 1001 and connected to the image processing unit 920. The data transmitting unit 930 may be configured to communicate with an external device.

In some embodiments, the data transmitting unit 930 may transmit information of the image and information of the emotion of the user to the external device, which may facilitate to store and analyze the information of the image and information of the emotion of the user. Thus it may allow the head-mounted display device to better understand the intention of the user and improve the interactive experience of the user. Besides, it may achieve a relatively natural interaction of the user 115 through the VR, AR or MR products.

In some embodiments, the image collecting unit 910 may be configured to collect the facial image of at least one of a mouth, a nose, facial muscles, eyes, eyebrows, eyelids or a glabella of the user 115.

In some embodiments, the image collecting unit 910 may be configured to collect at least one of the mouth, the nose, the facial muscles, the eyes, the eyebrows, the eyelids or the glabella of the user 115, which may enable the image collecting unit 910 to comprehensively collect the facial image of the user. Thus it may allow the head-mounted display device to better understand the intention of the user and improve the interactive experience of the user. Besides, it may achieve a relatively natural interaction of the user through the VR, AR or MR products.

In some embodiments, the image collecting unit 910 may be detachably configured on the mounting component 1001. The image collecting unit 910 may be configured with a communication plug. The image processing unit 920 may be configured with a communication socket. The communication plug may plug into the communication socket such that the image collecting unit 910 may be connected to the image processing unit 920 to transmit data (e.g., a facial image of the user) thereto.

In some embodiments, when the image collecting unit 910 is non-functional, the user 115 may directly pull out the communication plug from the communication socket. The user 115 may then detach the image collecting unit 910 from the mounting component 1001 and replace the non-functional image collecting unit 910. When the image collecting unit 910 of a product is non-functional, the non-functional image collecting unit 910 may be replaced, and it may extend a service life of the product.

In some embodiments, as shown in FIGS. 10A and 10B, the mounting component 1001 may include a shell 1003 and an immobilizing component 1002. The shell 1003 may enclose a chamber. An end of the shell may be configured with an opening connected to the chamber. The shell may include a side panel 1003-1 and a front panel 1003-2. The image collecting unit 910 may be configured on the side panel 1003-1. The shell 1003 may cover on eyes of the user 115. The immobilizing component 1002 may be connected to the shell 1003 to fix the shell 1003 on the head of the user 115.

In some embodiments, the shell 1003 may cover on the eyes of the user 115. The shell 1003 and the face of the user 115 may form an enclosed chamber, and it may reduce an amount of light emitted into the enclosed chamber, reducing an impact of the ambient light on a sight of the user to allow the user 115 to view contents displayed on the display component 1004 more clearly.

It should be noted that other components that being configured to fix the shell 1003 on the head of the user are within the protection scope of the present disclosure. For example, the immobilizing component 1002 may include a helmet, a fixing belt, a fixed clip, etc.

As shown in FIGS. 10A and 10B, the immobilizing component 1002 may include the fixing belt.

In some embodiments, as shown in FIG. 10B, the image collecting unit 910 may include an internal collecting sub-unit (or referred to as an internal image receiver) 911 and an external collecting sub-unit (or referred to as an external image receiver) 912.

In some embodiments, the internal collecting sub-unit 911 may be configured inside the containing chamber and fixed on an inner surface of the side panel 1003-1. The external collecting sub-unit 912 may be configured on an external surface of the side panel 1003-1.

In some embodiments, the internal collecting sub-unit 911 may collect facial image of eyes of the user and a surrounding thereof. The external collecting sub-unit 912 may collect facial images of the mouth of the users and a surrounding thereof. Thus, the image collecting unit 910 to comprehensively collect the facial image of the user. The internal collecting sub-unit 911, the external collecting sub-unit 912, and the manner they are configured on the head-mounted display device may further allow the head-mounted display device to better understand the intention of the user and improve the interactive experience of the user. Besides, the internal collecting sub-unit 911, the external collecting sub-unit 912, and the manner they are configured on the head-mounted display device may achieve a relatively natural interaction of the user 115 through the VR, AR or MR products.

In some embodiments, as shown in FIG. 10B, the display component 1004 may include a display screen 1006 and a lens component 1005. The display screen 1006 may be configured on the front panel 1003-2. The lens component 1005 may include frames 1005-2 and lenses 1005-1. The frames 1005-2 may be connected to the side panel 1003-1. The lenses 1005-1 may be configured on the frames 1005-2. The user 115 may view the display screen 1006 through the lenses 1005-1.

In some embodiments, the user 115 may watch the display screen 1006 through the lenses, and the user 115 may see dynamic views and entity actions of an environment, which may make the user 115 feel immersed in the environment.

In some embodiments, the display screen 1006 may include a curved display screen. In some embodiments, the curved display screen may provide a wide panoramic image effect. Besides, the employment of the curved display screen may reduce an off-axis distortion when the user 115 watches the display screen 1006 within a close range, improving the comfort of using the products and the competitive of the products in the market.

Figure 11:
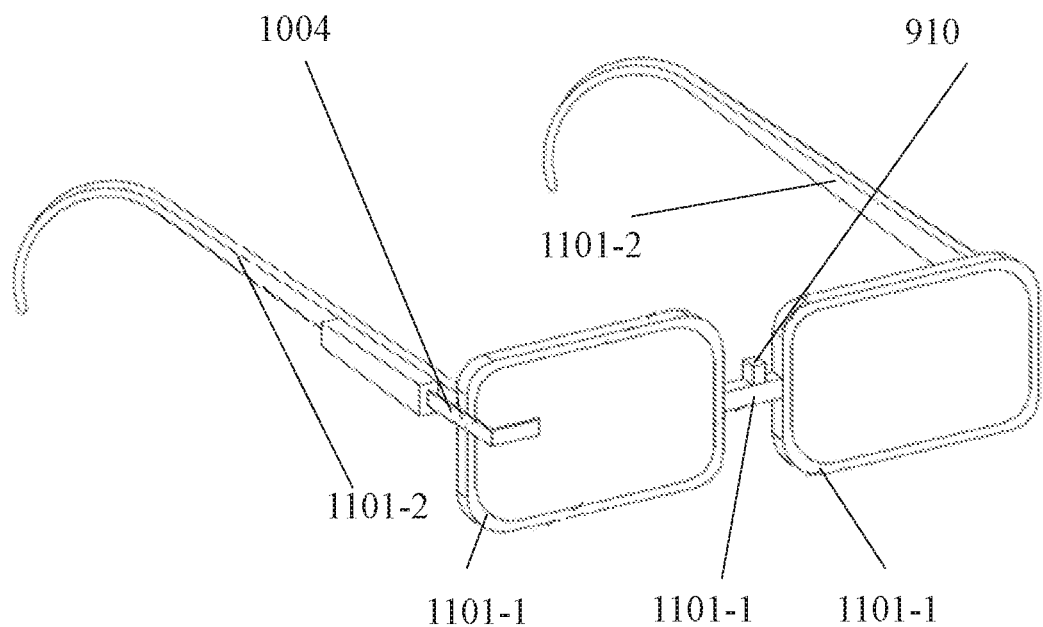
FIG. 11 is a schematic diagram illustrating an exemplary head-mounted display device according to some embodiments of the present disclosure.

FIG. 11 is a schematic diagram illustrating an exemplary head-mounted display device according to some embodiments of the present disclosure. As shown in FIG. 11, the head-mounted display device may include a mounting component 1101, a display component 1104 and an image collecting unit 910. Detailed description of the display component 1104 may refer to the description of the display component 1004 in FIG. 10. The mounting component 1101 may include brackets 1101-1 and temples 1001-2.

In some embodiments, the image collecting unit 910 may be configured on the brackets 1101-1. The display component 1104 may include a projector configured on the mounting component 1101. The projector may be configured to project an image on the eyes of the user 115.

In some embodiments, the projector may project an image on the eyes of the user 115, and the user 115 may see two views of the image. One view of the image may include realistic views, and another view of the image may include virtual views projected by the projector. That is to say, the views seen by the user 115 may include the realistic views and the virtual views, improving a sense of reality of the user experience.

In some embodiments, a projector may be configured on a front of the brackets 1101-1 and connected to the temples 1101-2. In some embodiments, the projector may be configured on two sides of the brackets 1101-1, and the projector may project the images on the eyes of the user from the two sides. In some embodiments, the projector may be configured on an upper of the brackets 1101-1, and the projector may project the images on the eyes of the user from the upper. The projector may directly project the images on the eyes of the user. Alternatively or additionally, the projector may project the images on the lenses (not shown), and then project the images on the eyes of the user through the lenses.

In some embodiments, a process for using the head-mounted display device illustrated in FIG. 10A, FIG. 10B, and/or FIG. 11 may include: mounting the head-mounted display device on the head of a user by the user 115, collecting a facial image of the user by the image collecting unit 910 (i.e., collecting a facial expression of the user and transmitting a signal of the facial image by the image collecting unit 910), receiving the signal of the facial image and processing the signal to determine the emotion of the user by the image processing unit 920. Thus the analyzing of the image processing unit 920 may allow the head-mounted display device to better understand the intention of the user and improve the interactive experience of the user. Besides, it may achieve a relatively natural interaction of the user 115 through the VR, AR or MR products.

Figure 13A:
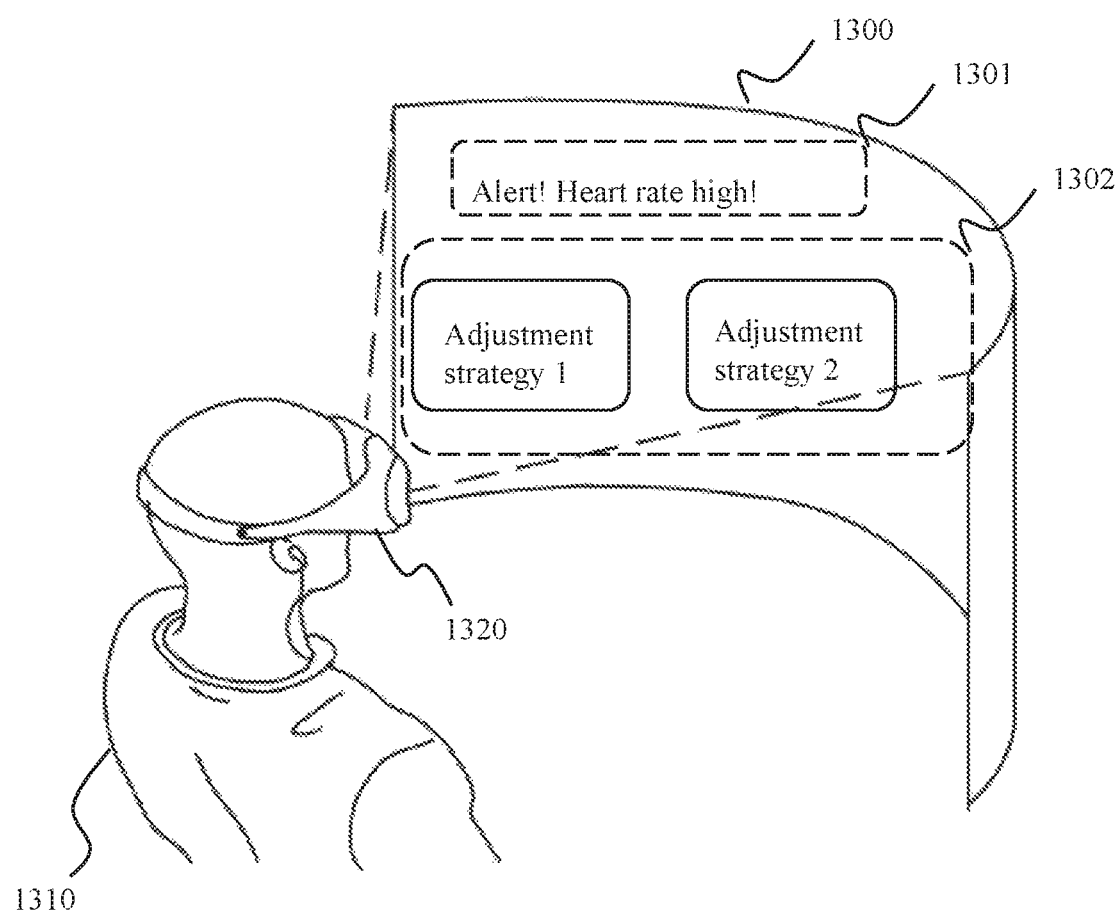
FIG. 13A, 13B are schematic diagrams illustrating an exemplary interaction system according to some embodiments of the present disclosure.
Figure 13B:
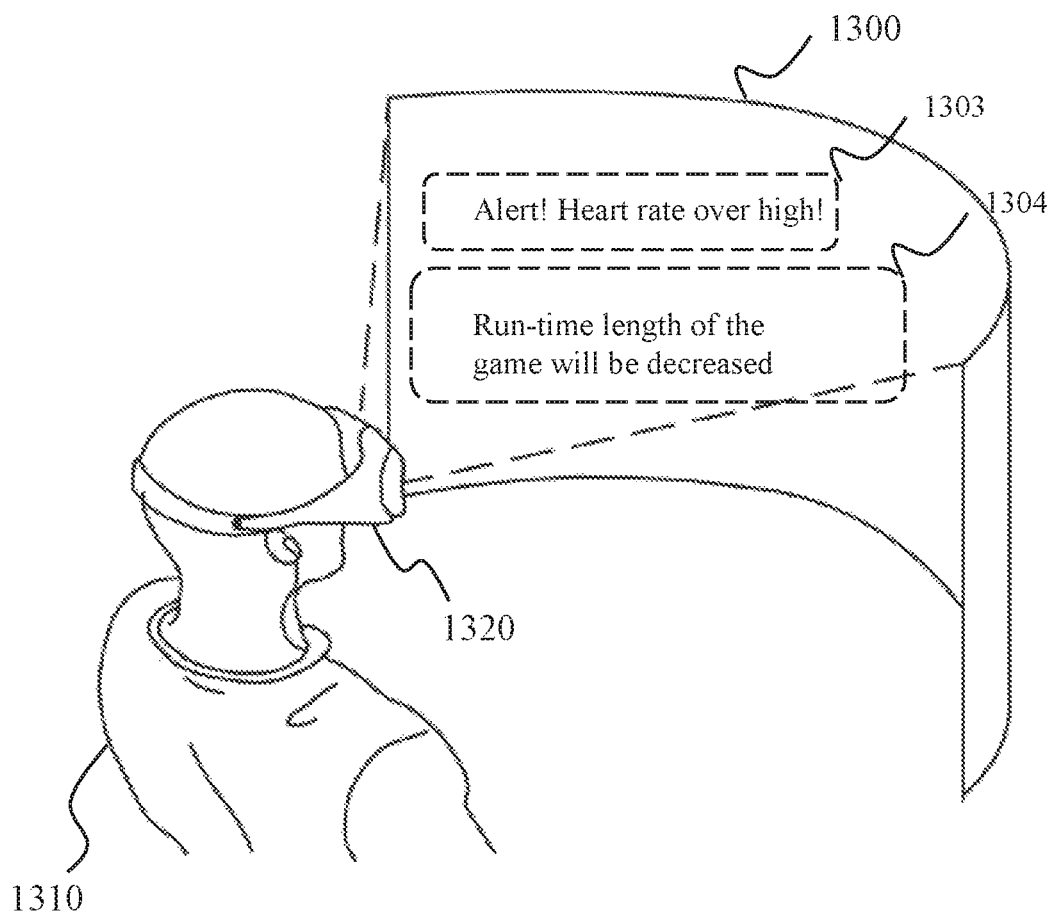

FIG. 13A, 13B are schematic diagrams illustrating an exemplary interaction system 100 according to some embodiments of the present disclosure. As illustrated in FIG. 13A, a user 1310 may wear a HMD 1320 on his or her head. A display 1300 may be arranged in front of the user 1310 to present information to the user. The user 1310 may be operating an application or an operating system. The display 1300 may present an alert related to physiological state of the user and a set of options for the user to choose. For example, the display 1300 may present an alert "Alert! Heart rate high!" 1301 to the user, and two options 1302 including "Adjustment strategy 1" and "Adjustment strategy 2" for the user to choose. The user 1310 may make a choice from the two options 1302, and the application or the operating system may continue running based on the chosen option.

As illustrated in FIG. 13B, a user 1310 may wear a HMD 1320 on his or her head. A display 1300 may be arranged in front of the user 1310 to present information to the user. The user 1310 may be operating an application or an operating system. The display 1300 may present an alert related to physiological state of the user and a notification related to an upcoming adjustment of the application or the operating system. For example, the display 1300 may present an alert "Alert! Heart rate high!" 1301 to the user, and a notification 1304 "Run-time length of the game will be decreased" to the user. The user 1310 may be aware of the upcoming adjustment, and may get prepared for the upcoming adjustment.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, in the present disclosure, the term "a plurality of" may refer two or more, unless the context clearly indicates otherwise. The terms "install," "link," "connect," and "fix" used herein in should be broadly understood. For example, the term "connect" may refer to a fixed connection, a detachable connection, an integral connection. As another example, the term "link" may refer to a direct link or a link by an intermediate media. For those skilled in the art, they can understand the meanings of the terms in the present disclosure based on a specific condition.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, radio frequency (RF), or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to surface modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

I claim:

1. A system, comprising:
    a head-mounted display device;
    at least one sensor implemented on the head-mounted display device;
    at least one storage medium including a set of instructions; and
    at least one processor configured to communicate with the at least one storage medium, wherein when executing the set of instructions, the system is configured to:

acquire, by the at least one sensor, a first facial image of a user; and determine, by the at least one processor, an expression of the user at least based on the first facial image of the user, wherein to determine the expression of the user at least based on the first facial image of the user, the at least one processor is configured to:

extract a first feature from the first facial image, the first feature corresponding to a facial point of the user;

extract a second feature from a second facial image, the second facial image of the user being behind the first facial image of the user in terms of time, the second feature corresponding to the facial point of the user;

determine a movement of the facial point of the user based on the extracted first feature and the second feature; and determine the expression of the user based on a neural network and the determined movement of the facial point of the user;

determine, by the at least one processor, an identification of the user based on the first facial image of the user; and recommend, by the at least one processor, an item to the user based on the expression of the user and historical information associated with the identification of the user.

2. The system of claim 1, wherein the system is further configured to:

store the determined expression of the user as a digital file in the storage medium; and update the neural network model based on the determined expression of the user.

3. The system of claim 1, wherein the system is further configured to:

acquire, by the at least one sensor, biological information of the user; and process the biological information of the user and the facial image of the user to determine the expression of the user.

4. The system of claim 1, wherein the system is further configured to:

determine an emotional state of the user based on the determined expression of the user; and provide a feedback based on the determined emotional state of the user.

5. The system of claim 4, wherein the system is further configured to:

provide a set of options related to the determined emotional state of the user for the user to choose; and receive information related to a choice among the set of options of the user.

6. The system of claim 4, wherein the system is further configured to:

adjust a running parameter of the application or the operating system.

7. The system of claim 6, wherein the application is a game application, and the parameter is related to a rate of progress of the game application, or a difficulty level of the game application.

8. A method implemented on a head-mounted display device, comprising:

acquiring, by at least one sensor implemented on the head-mounted display device, a first facial image of a user; and determining an expression of the user at least based on the first facial image of the user, wherein the determining the expression of the user at least based on the first facial image of the user comprises:

extracting a first feature from the first facial image, the first feature corresponding to a facial point of the user;

extracting a second feature from a second facial image, the second facial image of the user being behind the first facial image of the user in terms of time, the second feature corresponding to the facial point of the user;

determining a movement of the facial point of the user based on the extracted first feature and the second feature; and determining the expression of the user based on a neural network and the determined movement of the facial point of the user;

determining an identification of the user based on the first facial image of the user; and recommending an item to the user based on the expression of the user and historical information associated with the identification of the user.

9. The method of claim 8, further comprising:

determining an emotional state of the user based on the determined expression of the user; and providing a feedback based on the determined emotional state of the user.

10. The method of claim 9, wherein the providing a feedback based on the determined emotional state of the user comprises:

providing a set of options related to the determined emotional state of the user for the user to choose; and receiving information related to a choice among the set of options of the user.

11. The method of claim 9, wherein the providing a feedback based on the determined emotional state of the user comprises:

adjusting a running parameter of an application or operating system.

12. A method implemented on a head-mounted display device having or being connected to at least one processor and storage, comprising:

obtaining, by at least one sensor implemented on the head-mounted display device, biological information of a user, wherein the biological information includes pupil information of the user;

determining, based on the obtained biological information of the user, an adjustment strategy corresponding to at least one running parameter of an application or an operating system;

adjusting the at least one running parameter of the application or the operating system;

determining an identification of the user based on the obtained biological information of the user; and recommending an item to the user based on historical information associated with the identification of the user.

* * * * *